United States Patent
Teroerde et al.

(10) Patent No.: US 8,105,140 B2
(45) Date of Patent: Jan. 31, 2012

(54) METHOD FOR DISTRIBUTING A MATERIAL FLOW ONTO A FIELD, AND CHOPPING AND SPREADING DEVICE

(75) Inventors: Stefan Teroerde, Warendorf (DE);
Joern Brinkmann, Harsewinkel (DE);
Christopher Vieregge, Doerentrup (DE); Martin Niermann, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 12/884,267

(22) Filed: Sep. 17, 2010

(65) Prior Publication Data

US 2011/0070934 A1 Mar. 24, 2011

(30) Foreign Application Priority Data

Sep. 21, 2009 (DE) .......................... 10 2009 042 002

(51) Int. Cl.
*A01F 12/40* (2006.01)
(52) U.S. Cl. ...................................................... 460/112
(58) Field of Classification Search .................. 460/112, 460/111, 901; 239/673, 682, 666; 56/504
See application file for complete search history.

(56) References Cited

U.S. PATENT DOCUMENTS

| | | | | |
|---|---|---|---|---|
| 4,735,216 A * | 4/1988 | Scott et al. | ...................... | 460/112 |
| 5,021,030 A * | 6/1991 | Halford et al. | ................ | 460/111 |
| 6,251,009 B1 * | 6/2001 | Grywacheski et al. | ........ | 460/112 |
| 6,331,142 B1 * | 12/2001 | Bischoff | ........................ | 460/112 |
| 6,406,368 B1 * | 6/2002 | Cruson et al. | .................. | 460/111 |
| 6,416,405 B1 * | 7/2002 | Niermann | ......................... | 460/79 |
| 6,598,812 B1 * | 7/2003 | Matousek et al. | ............. | 239/682 |
| 6,602,131 B2 * | 8/2003 | Wolters | .......................... | 460/111 |
| 6,663,485 B2 * | 12/2003 | Niermann | ....................... | 460/79 |
| 6,685,558 B2 * | 2/2004 | Niermann et al. | ............. | 460/111 |
| 6,736,721 B2 | 5/2004 | Niermann et al. | | |
| 7,086,942 B2 * | 8/2006 | Niermann et al. | ............. | 460/111 |
| 7,220,179 B2 * | 5/2007 | Redekop et al. | ............... | 460/112 |
| 7,261,633 B2 * | 8/2007 | Benes | ............................ | 460/111 |
| 7,306,174 B2 * | 12/2007 | Pearson et al. | ................ | 239/663 |
| 7,331,855 B2 * | 2/2008 | Johnson et al. | ............... | 460/112 |

FOREIGN PATENT DOCUMENTS

| | | |
|---|---|---|
| DE | 10 2006 042 553 | 3/2008 |
| EP | 1 277 387 | 1/2003 |
| EP | 1897430 A1 * | 3/2008 |
| WO | WO 2008156419 A1 * | 12/2008 |
| WO | WO 2010149500 A1 * | 12/2010 |

* cited by examiner

*Primary Examiner* — Arpad Fabian-Kovacs
(74) *Attorney, Agent, or Firm* — Michael J. Striker

(57) ABSTRACT

In a method and device for spreading a material flow onto a field, the material flow emerging from a chopping mechanism of a chopping and spreading device, in particular a combine mounted straw chopper on a combine harvester, is conveyed to at least one guide element which is situated transversely to the longitudinal axis of the chopping mechanism, the guide element accelerates the material flow and conveys it to at least one downstream spreading unit, the material flow emerging from the at least one guide element is conveyed by a plane of conveyance, in which the material flow enters the at least one guide element, onto a spreading plane situated below the plane of conveyance; in the spreading plane, and the material flow is distributed by the at least one spreading unit onto the field.

13 Claims, 4 Drawing Sheets

METHOD FOR DISTRIBUTING A MATERIAL FLOW ONTO A FIELD, AND CHOPPING AND SPREADING DEVICE

CROSS-REFERENCE TO RELATED APPLICATION

The invention described and claimed hereinbelow is also described in German Patent Application DE 10 2009 042 002.9 filed on Sep. 21, 2009. This German Patent Application, whose subject matter is incorporated here by reference, provides the basis for a claim of priority of invention under 35 U.S.C. 119(a)-(d).

BACKGROUND OF THE INVENTION

The invention relates to a method for spreading a material flow onto a field, the material flow emerging from a chopping mechanism of a chopping and spreading device, in particular a combine mounted straw chopper on a combine harvester, wherein the material flow is conveyed to at least guide element which is situated transversely to the longitudinal axis of the chopping mechanism, the guide element accelerating the material flow and conveying it to at least one downstream spreading unit. The invention furthermore relates to a chopping and spreading device, in particular a combine mounted straw chopper for combine harvesters, comprising at least one chopping mechanism, to which at least one spreading unit is assigned to spread a material flow emerging from the chopping mechanism, wherein the material flow is conveyed to the at least one spreading unit by at least one guide element which is situated transversely to the longitudinal axis of the chopping mechanism.

Document DE 10 2006 042 553 A1 makes known a method for spreading a material flow onto a field, and a chopping and spreading device of the initially named type. The chopping and spreading device includes a chopping mechanism, downstream of which two guide elements are situated which extend transversely to the longitudinal axis of the chopping mechanism. The guide elements further convey a material flow emerging from the chopping mechanism to two spreading units which are aligned in the direction of conveyance, are disposed on the particular guide element, and likewise extend transversely to the longitudinal axis of the chopping mechanism. The two spreading units distribute the material flow across a partial spreading width on the field. The two guide elements and the spreading units situated downstream thereof are disposed such that they lie in a plane and are interconnected by guide rails, and therefore the material flow is conveyed by the guide elements toward the spreading units in a plane of conveyance.

The disadvantage of this embodiment according to the prior art is that the material flow that has been accelerated by the guide elements impacts the rotating elements of the particular spreading unit perpendicularly, thereby slowing down the material flow. The reduced speed of the flow of the material must be compensated for accordingly by the spreading unit, which manifests as an additional acceleration of the material flow which, in turn, results in increased energy usage.

SUMMARY OF THE INVENTION

The problem to be solved by the present invention is that of increasing the efficiency of the method for distributing the material flow, and to further develop a chopping and spreading device such that the material flow is distributed evenly, even across large spreading widths.

It is therefore an object of the present invention to provide a method for distributing a material flow onto a field, and a chopping and spreading device, which avoid the disadvantages of the prior art.

In accordance with the method for distributing the material flow onto a field of the present invention, the material flow that emerges from the at least one guide element is conveyed by a plane of conveyance, in which the material flow enters the at least one guide element, onto a spreading plane situated below the plane of conveyance; in the spreading plane, the material flow is spread by the at least one spreading unit onto the field. Given that the material flow is conveyed from the plane of conveyance—which is disposed at a higher level, and in which the material flow is passed from the chopping mechanism to the at least one guide element—to the spreading plane, which is disposed at a lower level, of the at least one spreading device, the material flow is prevented from perpendicularly impacting the rotating parts of the at least one spreading unit. The kinetic energy of the material flow, which is accelerated by the at least one guide element, is retained to a greater extent, thereby reducing the amount of energy that must be expended for the at least one spreading unit to distribute the material flow.

Preferably, the spreading plane can be slanted transversely to the plane of conveyance, and/or perpendicularly thereto. It can therefore be easily varied.

According to an advantageous further development of the method, the material flow emerging from the chopping mechanism is accelerated in the guide element in a direction opposite the acceleration that occurs in the spreading unit. The material flow that enters the at least one spreading unit is therefore captured in its direction of conveyance by the rotating parts of the at least one spreading unit, and is accelerated further. The material flow that is conveyed therefore follows a substantially S-shaped path from the plane of conveyance toward the spreading plane.

In particular, the material flow can be accelerated to different extents in the guide element and in the spreading unit. For example, the acceleration of the material flow in the at least one guide element in the plane of conveyance can be selected to be slower than in the spreading unit situated downstream of the guide element since the two-fold acceleration makes it possible to achieve greater circumferential velocities of the material flow than can be achieved using the chopping and spreading device known from the prior art.

Preferably, the acceleration of the material flow in the guide element and in the spreading unit can be adjusted independently of each other. The advantage of this is that the acceleration that is applied to the material flow by the at least one guide element and by the at least one spreading unit can be adapted to the different influencing parameters such as the amount of moisture remaining in the material to be spread. This helps to increase efficiency and reduce energy consumption. Given that the acceleration can be adjusted independently, it is possible to maintain an even spreading width that was selected according to a default setting; the spreading width is typically based on the working width of the agricultural harvesting machine.

In the chopping and spreading device in accordance with the present invention, the at least one spreading unit is slanted relative to the longitudinal axis of the at least one guide element. By slanting the spreading unit relative to the longitudinal axis of the guide element, the casting width is increased.

To prevent the material flow from become stuck between the guide element and the spreading unit when the harvesting procedure or chopping procedure are interrupted when the assembly is shut down, the spreading unit can be connected to the guide element via a profiled channel that is open toward the bottom, thereby enabling the material situated in the channel to drop downward.

Furthermore, the guide element and the spreading unit, as viewed in the longitudinal direction of the chopping and spreading device, can be offset relative to each other such that the material flow enters the spreading unit tangentially to the wall, thereby reducing losses of the kinetic energy that was applied to the material flow when it was initially accelerated in the guide element.

Advantageously, the spreading unit can be transferred from an operating position, in which the material flow is spread evenly onto the field across a spreading width that corresponds to the working width of an agricultural harvesting machine, into a transport or windrowing position. For transport or to lay down swaths, the spreading unit can be swiveled about an axis that is parallel to the longitudinal axis of the spreading device. The spreading unit can therefore be transferred to a position in which the entire width of the combine harvester does not exceed the width of the vehicle that is permissible for street travel. In this position as well, the material flow can be laid down in swaths on the field.

A mechanical drive can be provided as the drive for the guide element, while the spreading unit can preferably include a hydraulic drive. The reverse case is likewise feasible, as is the use of only one type of drive.

To obtain an optimized spreading width and efficient use of the necessary drive energy, the drives of the guide element and the spreading unit can be controlled independently of each other. Easy adaptability to changing working conditions such as different spreading widths or different compositions of the material flow can therefore be attained.

The guide element and the spreading unit are preferably designed as radial spreaders.

According to an advantageous further development, the guide element and the spreading unit can be modular in design. This makes it possible to retrofit an existing chopping and spreading device in order to make it more flexible in terms of spreading width.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
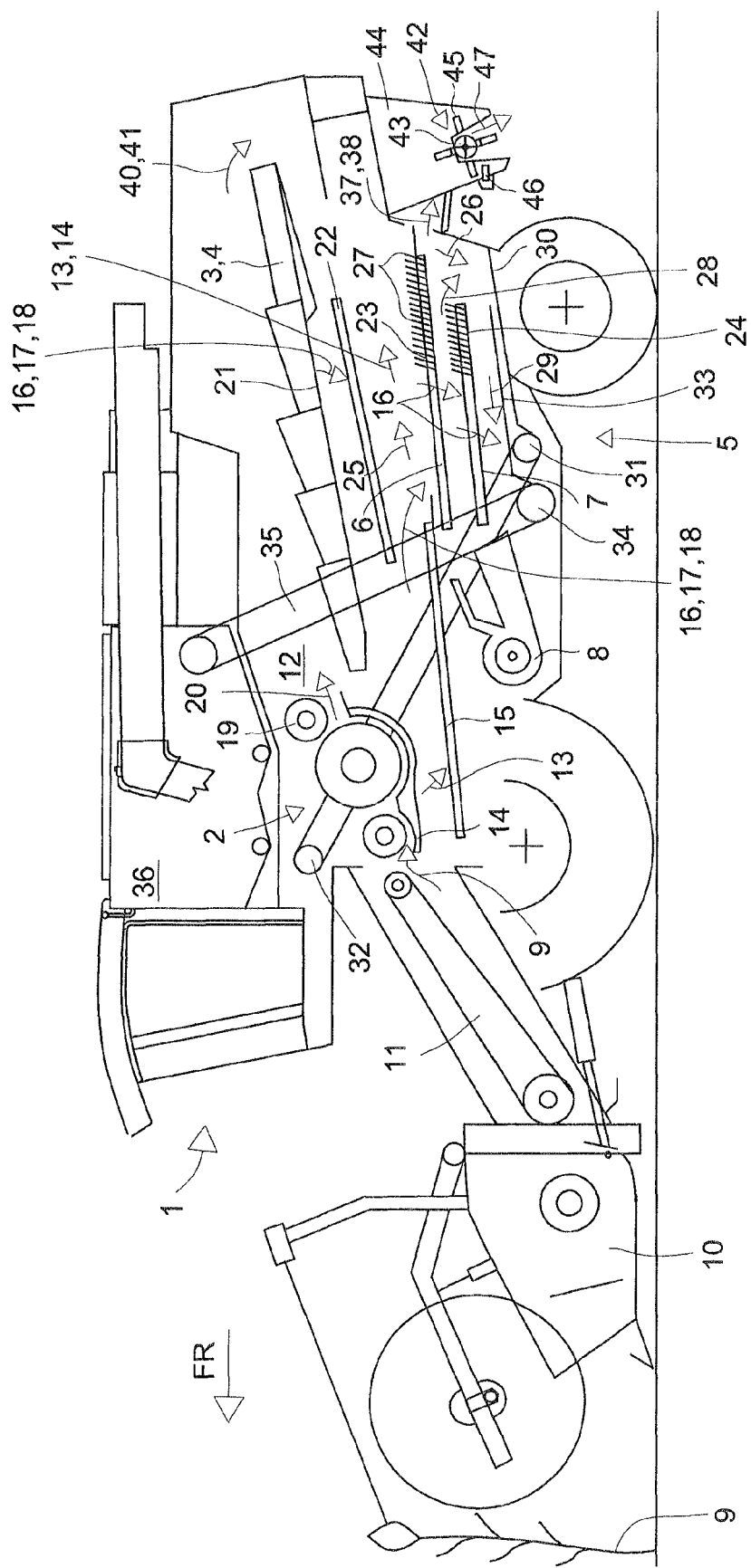
FIG. 1 a schematic side view of a self-propelled combine harvester that includes a chopping and spreading device.

FIG. 1 shows the side view of a harvesting machine designed as a combine harvester 1, including a threshing mechanism 2 which is known per se and is therefore not described in greater detail, and a downstream tray-type shaker 3, as the separating device 4. A cleaning device 5 is disposed underneath tray-type shaker 3 and is composed of two sieves 6, 7, which are disposed one above the other, and a cleaning fan 8. However, the invention is expressly not limited to types of combine harvesters having this design, and instead likewise relates e.g. to combine harvesters having rotors as the separating device.

A header 10 is disposed in the front region of combine harvester 1, and is used to cut and pick up crop 9. Header 10 conveys crop 9 to a feed rake 11 that is disposed on the front side of combine harvester 1. Feed rake 4 transfers crop 9 to threshing mechanism 2 located in machine housing 12. Threshing mechanism 2 processes crop 9 intensively, so that the grain is released from crop 9. A grain-chaff mixture 13, which is composed mainly of grain, is separated at threshing and separating grate 14 of threshing mechanism 2 and travels via a grain pan 15 to cleaning device 5, to separate grain 16 from the non-grain components, i.e., stalk parts 17 and chaff parts 18.

In the rear region, a rotating impeller 19, which receives material flow 20 that emerges from threshing mechanism 2 and is composed mainly of threshed stalks, is assigned to threshing mechanism 2; impeller 19 conveys material flow 20 to tray-type shaker 3 which conveys the material flow 20 into the rear region of combine harvester 1. Any grains 16 still present in material flow 20 and any short straw 17 and chaff 18 are separated out by falling through tray-type shaker 3—which includes sieve openings 21—to a return pan 22. Return pan 22 transports grain 16, short straw 17, and chaff 18 to grain pan 15.

Grain 16, short straw 17, and chaff 18 ultimately reach cleaning device 5—likewise via grain pan 10—in which grain 16 is separated from short straw 17 and chaff 18. This takes place such that air is blown through sieve openings 23, 24 in upper sieve 6 and lower sieve 7 using blower 8; the blowing air loosens crop material 25 directed via sieves 6, 7 into the rear region of combine harvester 1 and ensures that the specifically lightweight chaff and short-straw portions 17, 18 are separated out, while heavier crop grains 16 fall through sieve openings 23, 24.

A sieve pass-through 26, which falls through upper sieve 12 in tailings region 27, and a sieve overflow 28 at the end of lower sieve 13 usually contain heavier particles, i.e., non-threshed-out ears. Sieve pass-through 26 and sieve overflow 28 are jointly referred to below as the tailings portion of crop material 29. Tailings portion of the crop material 29 drops onto a diagonally extending capture pan 30 beneath cleaning device 5 and slides into a crop-delivery auger 31. Crop-delivery auger 31 conveys the tailings portion of the crop material 29 into a crop elevator 32 which returns it to threshing mechanism 2.

Grain 16 that passes through sieves 6, 7 of cleaning unit 5 drops onto a further diagonally extending capture and guide floor 33 and slides into a grain-delivery auger 34 which delivers grain 16 to a grain elevator 35. Grain elevator 35 conveys grain 16 into grain tank 36.

Straw 40 and a certain percentage of waste grain 41 travel via tray-type shaker 3 to the rear end of combine harvester 1, from where they are conveyed to a chopping and spreading device. Straw 40 and waste grain 41 drop at the end of tray-type shaker 3 into a straw chopper 42 which is a component of the chopping and spreading device. Straw chopper 42 includes a rotating chopper shaft 43 which is supported in a chopper housing 44. Chopper shaft 43 is equipped with movable blades 45 that mesh with counter-blades 46 which are fixedly disposed in chopper housing 44. Blades 45, 46 are used to chop and accelerate straw 40 into chopped material. Sieve overflow 28, which is composed largely of chaff 37, and which does not pass through upper sieve 6, travels via upper sieve 6 to the rear region of combine harvester 1 and is likewise conveyed to straw chopper 42. Material flow 47 emerging from straw chopper 42 is conveyed further via a driven guide element 52, which will be described in greater detail further below, and downstream channels 53 to two spreading units 54 of a spreading device 50, which spread the material flow 47 onto the field.

Figure 2:
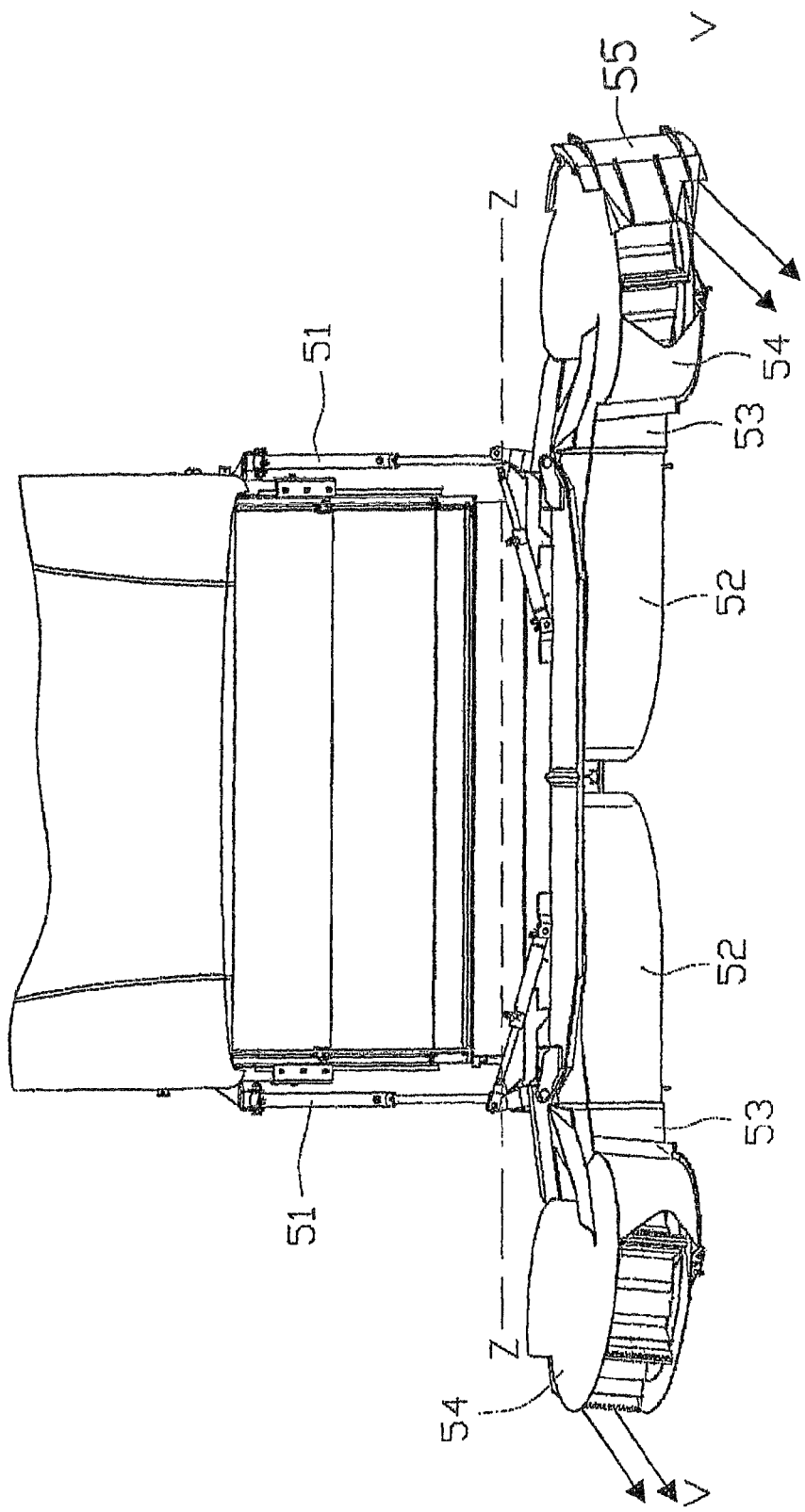
FIG. 2 a perspective view from above of a spreading device of the chopping and spreading device in its working position.

The depiction presented in FIG. 2 shows a perspective view from above of spreading device 50 of the chopping and spreading device in its working position. Spreading device 50 is disposed in the rear region of the combine harvester, and is height-adjustable using lever system 51. Spreading device 50 includes two guide elements 53 which are preferably mechanically driven and are disposed transversely to the longitudinal axis of straw chopper 42 on combine harvester 1. Furthermore, spreading device 50 includes two spreading units 54 which are interconnected, via particular guide element 52, by a tray-shaped channel 53 that is open toward the bottom. Spreading device 54 is preferably hydraulically driven. As an alternative, guide elements 52 and spreading device 54 can also be driven exclusively by mechanical drives or hydraulic drives.

The spacial disposition of guide elements 52 and spreading unit 54 relative to each other that exists when spreading device 50 is in its working position is designed such that spreading unit 54 is slanted relative to the longitudinal axis of associated guide element 52. In addition, spreading device 54 is likewise slanted transversely to the longitudinal axis of guide element 52. In this configuration, the orientation of guide elements 52 relative to straw chopper 42 is labeled as plane of conveyance Z, in which material flow 47 emerging from straw chopper 42 is conveyed to guide elements 52 which, in turn, accelerate material flow 47. To this end, particular guide element 52 includes a rotor that rotates about a vertical axis, and that is disposed in a housing provided with outlet openings.

Channel 53, into which particular spreading unit 54 leads, adjoins each outlet opening radially. The drive of particular guide element 52 is controlled such that the rotors of guide elements 52 rotate in opposite directions in order to redirect material flow 47 emerging from straw chopper 42 in the longitudinal direction of the combine harvester into a direction that extends approximately transversely to the longitudinal direction. To this end, the drives of guide elements 52 and spreading units 54 are connected to a control device that can be controlled using a user interface in the driver's cab of combine harvester 1. The particular drives of guide elements 52 and spreading units 54 can be controlled independently of each other by the control device, thereby enabling material flow 47 to be greatly accelerated.

Material flow 47 emerging from guide elements 52 is conveyed by particular channels 53 to adjoining spreading unit 54 which is oriented relative to guide element 52 such that it is slanted horizontally and vertically, said orientation being referred to as spreading plane V, wherein, according to the invention, spreading plane V is situated underneath plane of conveyance Z. As viewed in the longitudinal direction of straw chopper 42, guide element 52 and spreading device 54 are offset relative to each other such that material flow 47 enters it tangentially to the wall of spreading device 54. From spreading plane V outward, the material flow is distributed across an adjustable spreading width that preferably corresponds to half of the cutting width of the header. The adjustment of the spreading width can be influenced by changing the drive speeds of guide elements 52 and spreading devices 54. Furthermore, spreading devices 54 each include at least one adjustable partial cladding 55 that is used to change the discharge opening of spreading units 54 in a variable manner. Adjustable partial claddings 55 of this type are known from EP 1 277 387 B1, to which reference is hereby expressly made.

Figure 3:
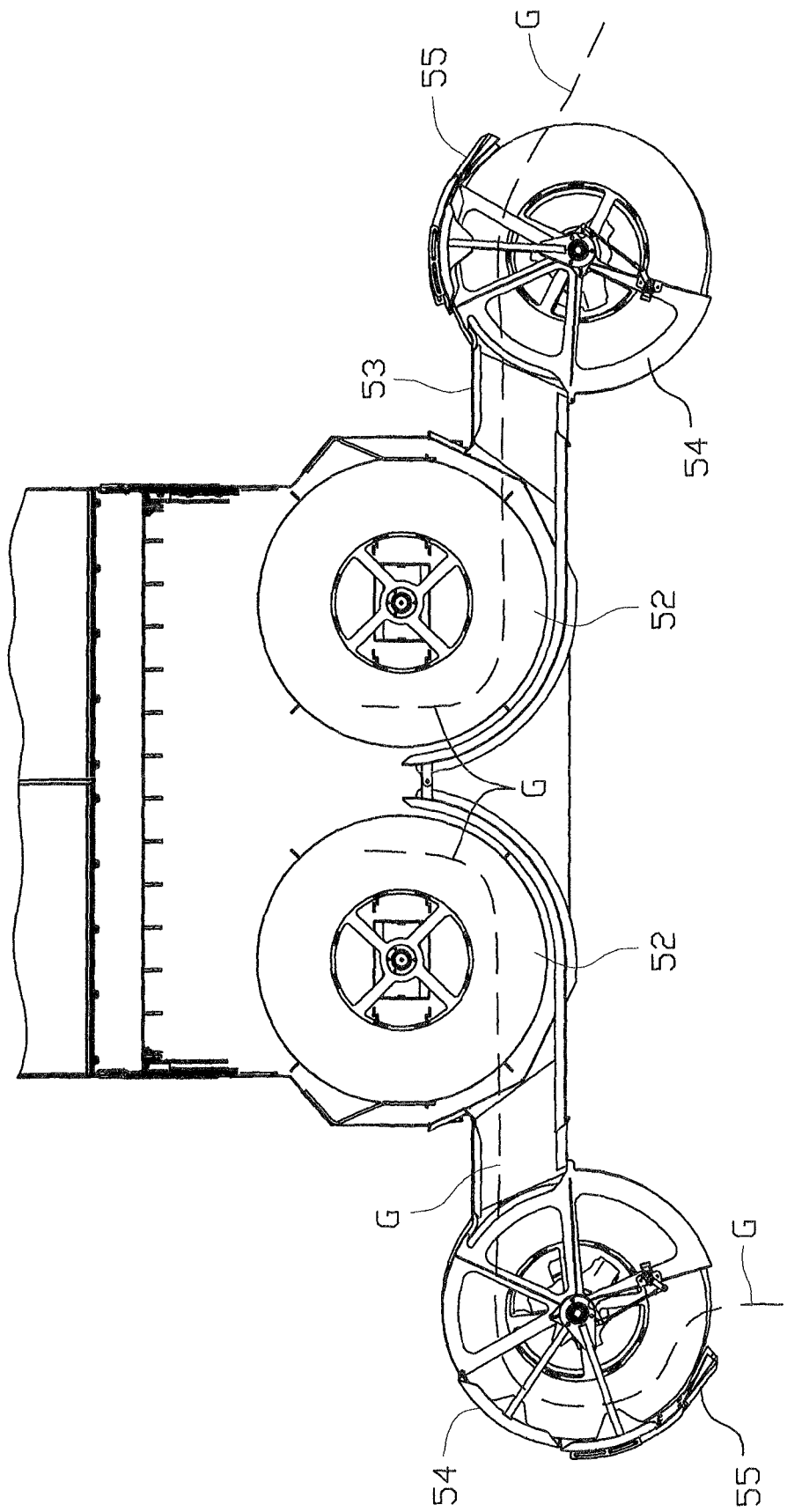
FIG. 3 a view of the spreading device according to FIG. 2, from below.

FIG. 3 shows a view of spreading device 50 from below; this illustration shows how guide element 52, channel 53, and spreading device 54 are open toward the bottom, at least in sections. Guide element 52 and spreading device 54 are designed as radial spreaders. The fact that spreading device 50 is open toward the bottom is advantageous when spreading device 50 is shut off due to an interruption in material flow 47 e.g. when straw chopper 42 is shut off. The crop material situated in spreader device 50 can simply drop downward, thereby ensuring that spreading device 50 does not become jammed.

The course of material flow, which is labelled with reference character G and is indicated by a dashed line, as shown in FIG. 3 will now be discussed briefly. Due to the placement of guide element 52, channel 53, and spreading unit 54, course of material flow G has a substantially S-shaped contour. The drive of guide element 52 shown rotates in the counterclockwise direction to accelerate material flow 47 situated in plane of conveyance Z in the direction of spreading device 54. Material flow 47 is conveyed through channel 53 to spreading unit 54. Given that plane of conveyance Z in guide element 52 and spreading plane V in spreading unit 54 are offset vertically as viewed in the longitudinal direction of the chopping and spreading device, material flow 47 emerging from channel 53 enters spreading unit 54 tangentially to the wall of spreading device 54.

The kinetic energy that has already been applied to material flow 47 by guide element 52 is therefore largely retained upon entry into spreading unit 54. In spreading unit 54, material flow 47 undergoes a further, preferably greater acceleration in order to spread material flow 47 onto the ground of a field in a variable spreading width. Due to the design of spreading device 50 shown in FIG. 2 which is a mirror image along the longitudinal axis of the combine harvester, the drives of guide element 52 and spreading unit 54 of the part that has not yet been shown rotate in opposite directions.

Figure 4:
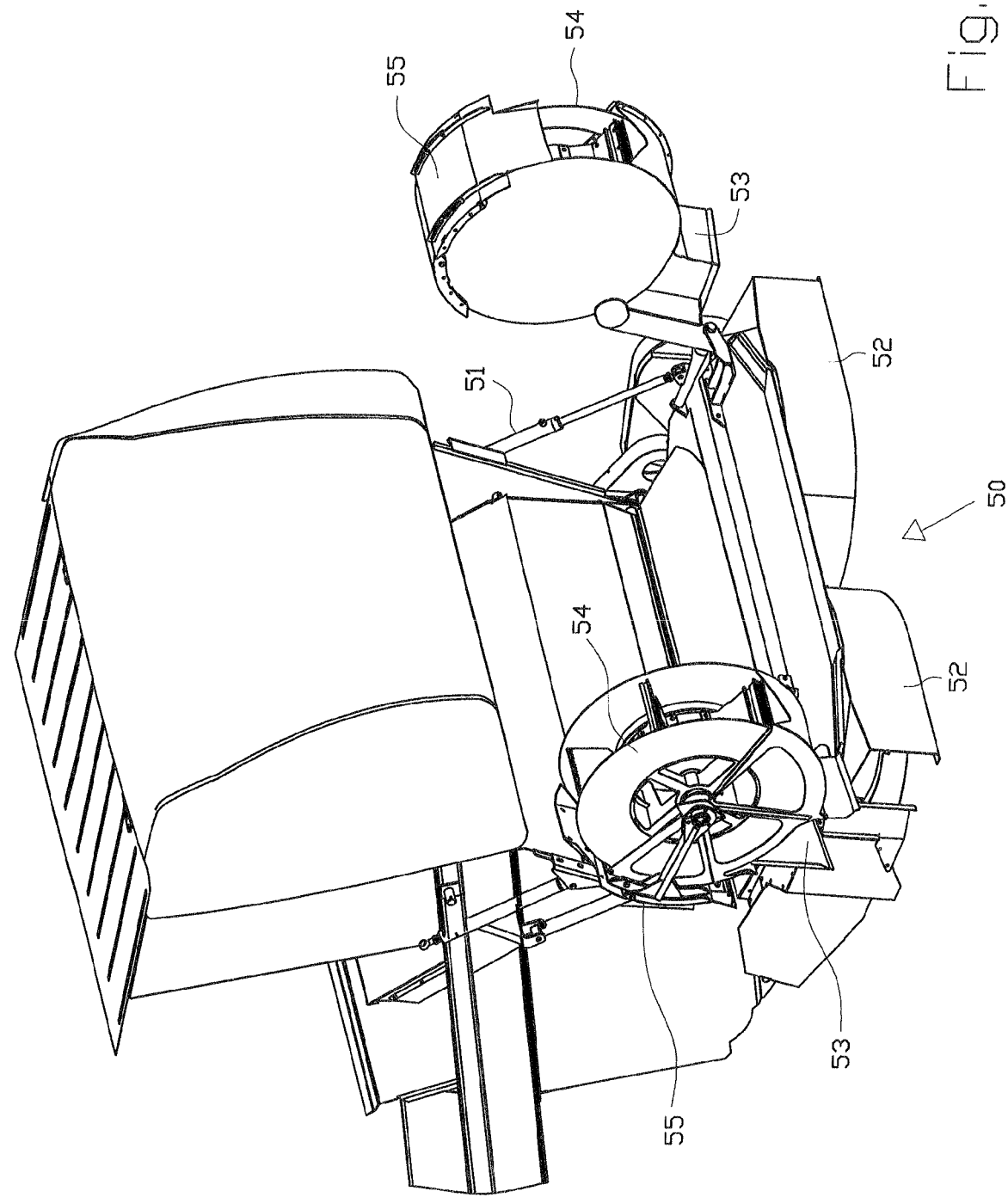
FIG. 4 a perspective view of the chopping and spreading device in a transport or windrowing position.

FIG. 4 shows a perspective view of spreading device 50 in its transport or windrowing position. To transfer spreading device 50 into its transport or windrowing position, spreading units 54 can be swiveled upward about an axis parallel to the longitudinal axis of straw chopper 42, and so spreading units 54 stand approximately perpendicularly to guide elements 52. The maximum width that is permissible for operation in road traffic is therefore not exceeded. In addition, this position of spreading device 50 makes it possible to deposit material flow 47 emerging from straw chopper 42 as swaths on the ground of the field.

Furthermore, the chopping and spreading device is modular in design to make it easy to replace components, but also to ensure that an existing conventional spreading device can be retrofitted.

It will be understood that each of the elements described above, or two or more together, may also find a useful application in other types of methods and constructions differing from the types described above.

While the invention has been illustrated and described as embodied in a method for distributing a material flow onto a field, and chopping and spreading device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A method for spreading a material flow onto a field, comprising the steps of ejecting the material flow from a chopping mechanism of a chopping and spreading device; conveying the material flow to at least one guide element situated transversely to a longitudinal axis of the chopping mechanism; accelerating the material flow by the at least one guide element; conveying the material flow from the at least one guide element to at least one downstream spreading unit by a plane of conveyance in which the material flow enters the at least one guide element onto a spreading plane situated below the plane of conveyance; and distributing the material flow in the spreading plane by the at least one spreading unit onto the field, wherein said accelerating by the at least one guide element includes accelerating the material flow in a direction opposite to an acceleration that occurs in the spreading unit and wherein said guide element and said spreading unit are offset relative to each other in a longitudinal direction of said chopping and spreading device such that the material flow enters said spreading unit tangentially to a wall of said spreading unit.

2. A method as defined in claim 1, wherein emerging the material flow from the chopping mechanism of the chopping and spreading device includes emerging the material flow from a combine mounted straw chopper of a combine harvester.

3. A method as defined in claim 1, further comprising slanting the plane of distribution to an orientation that is either transverse to the plane of conveyance or, perpendicular to the plane of conveyence.

4. The method as defined in claim 1, wherein said accelerating includes accelerating a material flow to different extents in the guide element and in the spreading unit.

5. The method as defined in claim 1, wherein said accelerating includes accelerating the material flow in the guide element and in the spreading unit independently of each other.

6. A method as defined in claim 1, further comprising slanting the plane of distribution to an orientation that is both transverse to the plane of conveyance and perpendicular to the plane of conveyance.

7. A chopping and spreading device, comprising at least one chopping mechanism from which a material flow emerges; at least one guide element situated transversely to a longitudinal axis of the chopping mechanism to which the material flow is conveyed and which accelerates the material flow; at least one downstream spreading unit to which the material flow is conveyed; a plane of conveyance conveying the material flow emerging from the at least one guide element and in which the material flow enters the at least one guide element onto a spreading plane which is situated below the plane of conveyance; and in which the at least one spreading unit distributes the material flow onto the field, wherein said accelerating by the at least one guide element includes accelerating the material flow in a direction opposite to an acceleration that occurs in the spreading unit and wherein said guide element and said spreading unit are offset relative to each other in a longitudinal direction of said chopping and spreading device such that the material flow enters said spreading unit tangentially to a wall of said spreading unit.

8. A chopping and spreading device as defined in claim 7, wherein emerging the chopping and spreading device is a combine mounted straw chopper of a combine harvester.

9. A chopping and spreading device as defined in claim 7, wherein said at least one spreading unit is slanted relative to a longitudinal axis of said at least one guide element.

10. A chopping and spreading device as defined in claim 7, wherein said spreading unit has a slant that is oriented transversely to a longitudinal axis of said guide element.

11. A chopping and spreading device as defined in claim 7, wherein said spreading unit is connected to said guide element via a profiled channel that is open toward a bottom.

12. A chopping and spreading device as defined in claim 7, wherein said spreading unit swivels about a spreading unit swivel axis that is parallel to a longitudinal axis of the chopping and spreading device.

13. A chopping and spreading device as defined in claim 7, wherein said guide element and said spreading unit are radial spreaders.

* * * * *